United States Patent
Rinkes

(10) Patent No.: US 8,519,823 B2
(45) Date of Patent: Aug. 27, 2013

(54) RADIO FREQUENCY IDENTIFICATION (RFID) TAG LOCATION SYSTEMS AND METHODS

(75) Inventor: Charles Rinkes, Medina, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 1139 days.

(21) Appl. No.: 11/589,938

(22) Filed: Oct. 31, 2006

(65) Prior Publication Data

US 2008/0100439 A1 May 1, 2008

(51) Int. Cl.
   *G08B 5/22* (2006.01)
(52) U.S. Cl.
   USPC ............... 340/7.32; 340/505; 340/572.4
(58) Field of Classification Search
   USPC ............... 340/7.32, 502, 505, 572.4
   See application file for complete search history.

(56) References Cited

U.S. PATENT DOCUMENTS

| | | | | |
|---|---|---|---|---|
| 5,500,651 A * | 3/1996 | Schuermann | ........... | 342/42 |
| 6,429,776 B1 * | 8/2002 | Alicot et al. | ........... | 340/572.1 |
| 6,600,418 B2 * | 7/2003 | Francis et al. | ........... | 340/572.1 |
| 6,917,290 B2 * | 7/2005 | Land | ........... | 340/539.1 |
| 7,221,269 B2 * | 5/2007 | Onderko et al. | ........... | 340/539.13 |
| 7,489,243 B2 * | 2/2009 | Brown et al. | ........... | 340/572.1 |
| 8,106,746 B2 * | 1/2012 | Maltseff et al. | ........... | 340/10.1 |
| 2003/0128100 A1 * | 7/2003 | Burkhardt et al. | ........... | 340/5.8 |
| 2005/0212676 A1 * | 9/2005 | Steinberg | ........... | 340/572.8 |
| 2005/0258940 A1 * | 11/2005 | Quan | ........... | 340/10.3 |
| 2006/0049946 A1 * | 3/2006 | Sullivan et al. | ........... | 340/572.2 |
| 2006/0197652 A1 * | 9/2006 | Hild et al. | ........... | 340/10.2 |
| 2006/0214773 A1 * | 9/2006 | Wagner et al. | ........... | 340/10.2 |
| 2006/0290472 A1 * | 12/2006 | Onderko et al. | ........... | 340/10.1 |
| 2007/0013481 A1 * | 1/2007 | Zhu et al. | ........... | 340/10.1 |
| 2007/0018793 A1 * | 1/2007 | Stewart et al. | ........... | 340/10.3 |

* cited by examiner

*Primary Examiner* — George Bugg
*Assistant Examiner* — Naomi Small
(74) *Attorney, Agent, or Firm* — Glenn Frankenberger; Terri H. Smith; Kenneth A. Haas

(57) ABSTRACT

Methods, systems, and apparatuses for ways of locating tags are described. A power level of a RFID communication signal transmitted by a RFID device, such as a reader, is adjusted to hone in on a specific tag. For example, the power level may be decreased or increased, depending on the situation, to hone in on the tag. The RFID device may be repositioned to aid in further honing in on the tag. Transmitting RFID communication signals, adjusting transmit power levels, and repositioning the RFID device may be iterated as needed to hone in on the tag.

21 Claims, 13 Drawing Sheets a second transmit power level for the transmitter is selected to be less than a first transmit power /512

FIG. 5B a second transmit power level for the transmitter is selected to be greater than the first transmit power /514

FIG. 5C a user to interact with a user interface associated with the transmitter to perform adjust the transmit power level /516

FIG. 5D

RADIO FREQUENCY IDENTIFICATION (RFID) TAG LOCATION SYSTEMS AND METHODS

BACKGROUND OF THE INVENTION

1. Field of the Invention

The present invention relates to wireless communications, and more particularly, to radio frequency identification (RFID) communication systems including RFID readers that communicate with RFID tags.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

In a RFID system, typically a reader transmits a continuous wave (CW) or modulated radio frequency (RF) signal to a tag. The tag receives the signal, and responds by modulating the signal, "backscattering" an information signal to the reader. The reader receives signals back from the tag, and the signals are demodulated, decoded and further processed.

With the maturation of RFID technology, efficient communications between tags and readers has become a key enabler in supply chain management, especially in manufacturing, shipping, and retail industries, as well as in building security installations, healthcare facilities, libraries, airports, warehouses etc.

Physically locating a specific tag in a population of tags is difficult. This is because readers typically have a reading range of terms of feet, and thus many tags may respond to interrogation signals of a reader at any one time. When multiple tags are within a communication range of a reader, a single tag cannot be physically distinguished from the other tags. Thus, what is desired are ways of physically locating specific tags within groups of tags.

BRIEF SUMMARY OF THE INVENTION

Methods, systems, and apparatuses for locating tags are described. In aspects, a power level of a RFID communication signal transmitted by a RFID device, such as a reader, is adjusted to hone in on a specific tag. The power level may be decreased or increased, depending on the situation, to hone in on the tag. Furthermore, the RFID device may be repositioned to aid in further honing in on the tag.

In an aspect of the present invention, a communication signal is transmitted from a transmitter at a selected transmit power level to determine a group of one or more tags present within a region, the group including a desired or selected tag. The transmit power level may be adjusted based at least in part on a number of tags present in the determined group and/or a read rate of the desired tag. A subsequent communication signal may be transmitted from the transmitter at the adjusted transmit power level to determine a subsequent group of one or more tags present within a subsequent region and a subsequent read rate of the desired tag. Additionally, the transmitter may be repositioned to transmit the subsequent communication signal from a different location.

In a further aspect, the transmitting, adjusting, and repositioning may be iterated as needed to hone in on the desired tag.

In another aspect of the present invention, a RFID communications device includes an antenna, a RFID module coupled to the antenna, and a power ranging module coupled to the RFID module. The RFID module is configured to generate a communication signal that is transmitted by the antenna at a transmit power level. The RFID module is configured to demodulate at least one tag response signal received by the antenna in response to the communication signal to determine a group of one or more tags present within a region and a read rate of a desired tag. The power ranging module is configured to adjust the transmit power level of the communication signal to enable an operator of the RFID communications device to hone in on a physical location of the desired tag.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 5A-5D show example steps for using a reader to locate a tag, according to an example embodiment of the present invention.

Figure 1:
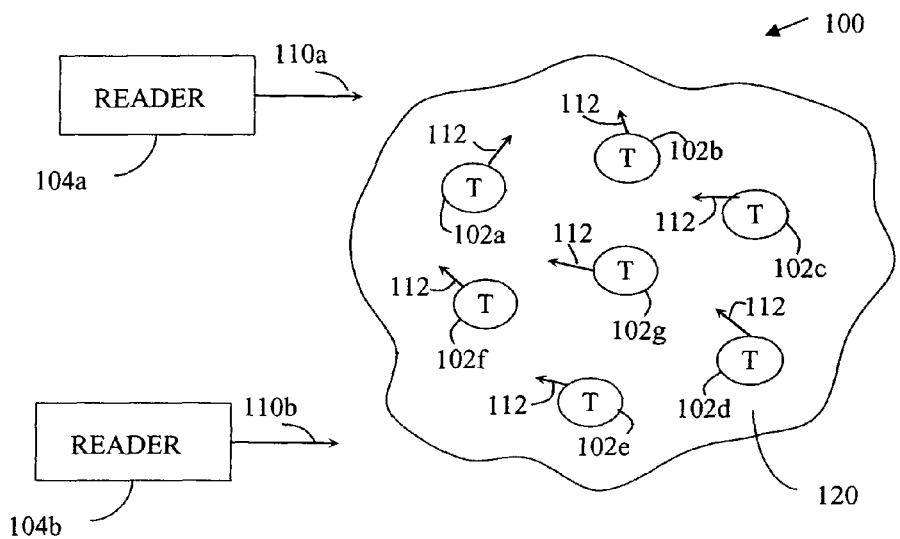
FIG. 1 shows an environment where RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 860-960 MHz, including 902-928 MHz, and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred, to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
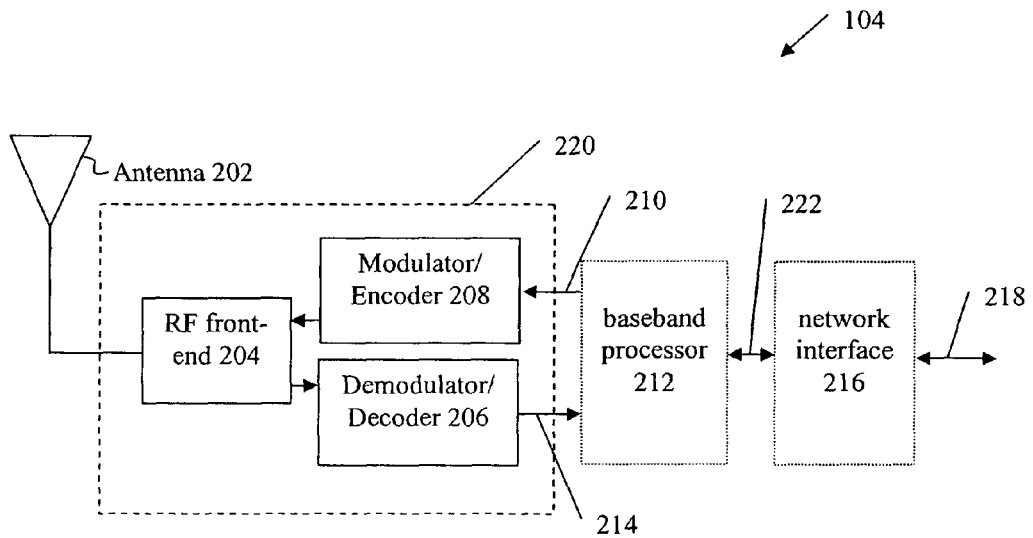
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
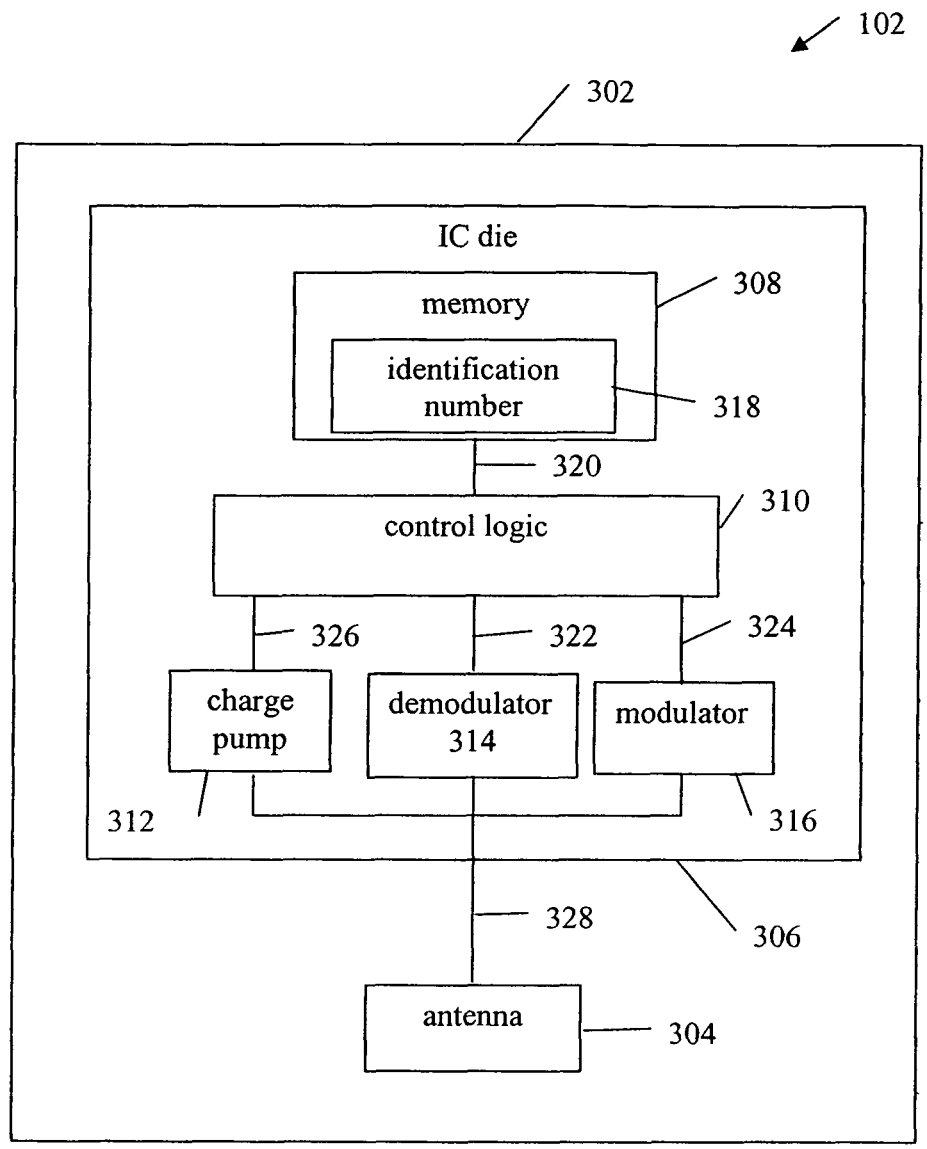
FIG. 3 shows a block diagram of an example radio frequency identification (RFID) tag.

The present invention is applicable to any type of RFID tag, including passive tags and active tags, and semiconductor based tags and surface acoustic wave (SAW) tags. For illustrative purposes, FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302.

IC 306 is attached to substrate 302, and is coupled to antenna 304. IC 306 may be attached to substrate 302 in a recessed and/or non-recessed location. IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328.

Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 controls the operation of RFID tag 102, based on internal logic, the information received from demodulator 314, and the contents of memory 308. Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Example embodiments of the present invention are described in further detail below. Such embodiments may be implemented in the environments and readers described above, and/or in alternative environments and alternative RFID devices.

Example Embodiments

Methods, systems, and apparatuses for using readers to locate tags are described below. A power level of a RFID communication signal transmitted by a RFID device, such as a reader, is adjusted to hone in on a desired tag. For example, the power level may be decreased or increased, depending on the situation, to further hone in the desired tag. Furthermore, the RFID device may be repositioned to aid in further honing in on the location of the tag.

Figure 4:
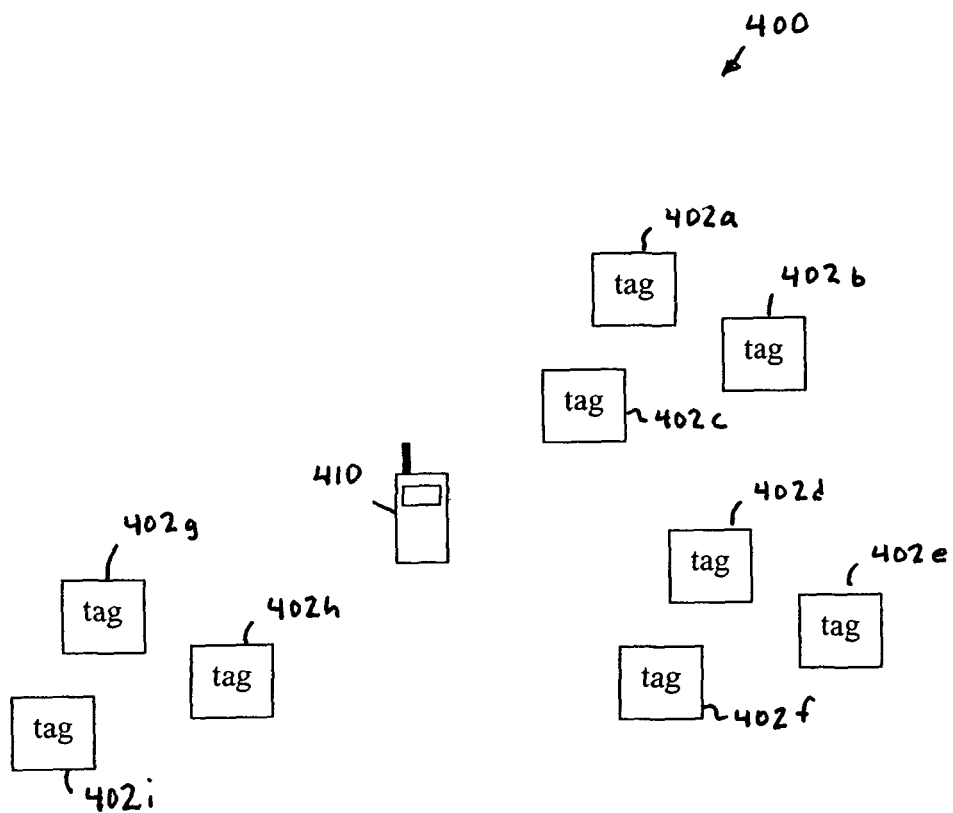
FIG. 4 shows an example RFID communications environment.

FIG. 4 shows an example RFID communications environment in which tags 402a-402i are located. Tags 402a-402i may each be associated with a corresponding item (not shown in FIG. 4). A RFID device 410, such as a mobile reader, may be used to read tags 402. However, physically locating a specific tag of tags 402a-402i, such as tag 402c, may be difficult. An operator of RFID device 410 may know where each of tags 402a-402i is located, but may not be able to discern tags 402a-402i from each other. Determining a physical location of tag 402c in environment 400 when other tags are present is difficult using a conventional RFID reader. If tag 402c was the only tag in a communication range of the reader, and a response was received to an interrogation performed by the reader, the operator would know that tag 402c responded, and thus would know the physical location of the responding tag, tag 402c. However, when additional tags 402a, 402b, and 402d-402i are in communication range of the reader, one or more of tags 402a, 402b, and 402d-402I, in addition to tag 402c may respond to an interrogation performed by the reader. In such situation, tag 402c could not be physically distinguished from the others tags 402a, 402b, and 402d-402i merely be responding, since it cannot be conventionally determined from which tag a response is being provided.

According to embodiments of the present invention, a transmit power level of RFID communications device 410 can be varied to enable a physical location of a specific tag, such as tag 402c, to be determined. One or more interrogations of tags can be performed at the various transmit power levels to hone in on the location of the tag, enabling the operator to advance or move generally toward the tag, until the specific tag can be physically identified. The operator of RFID communications device 410 may reposition device 410 between interrogations to further enable honing in on the location of the tag.

Figure 5A:
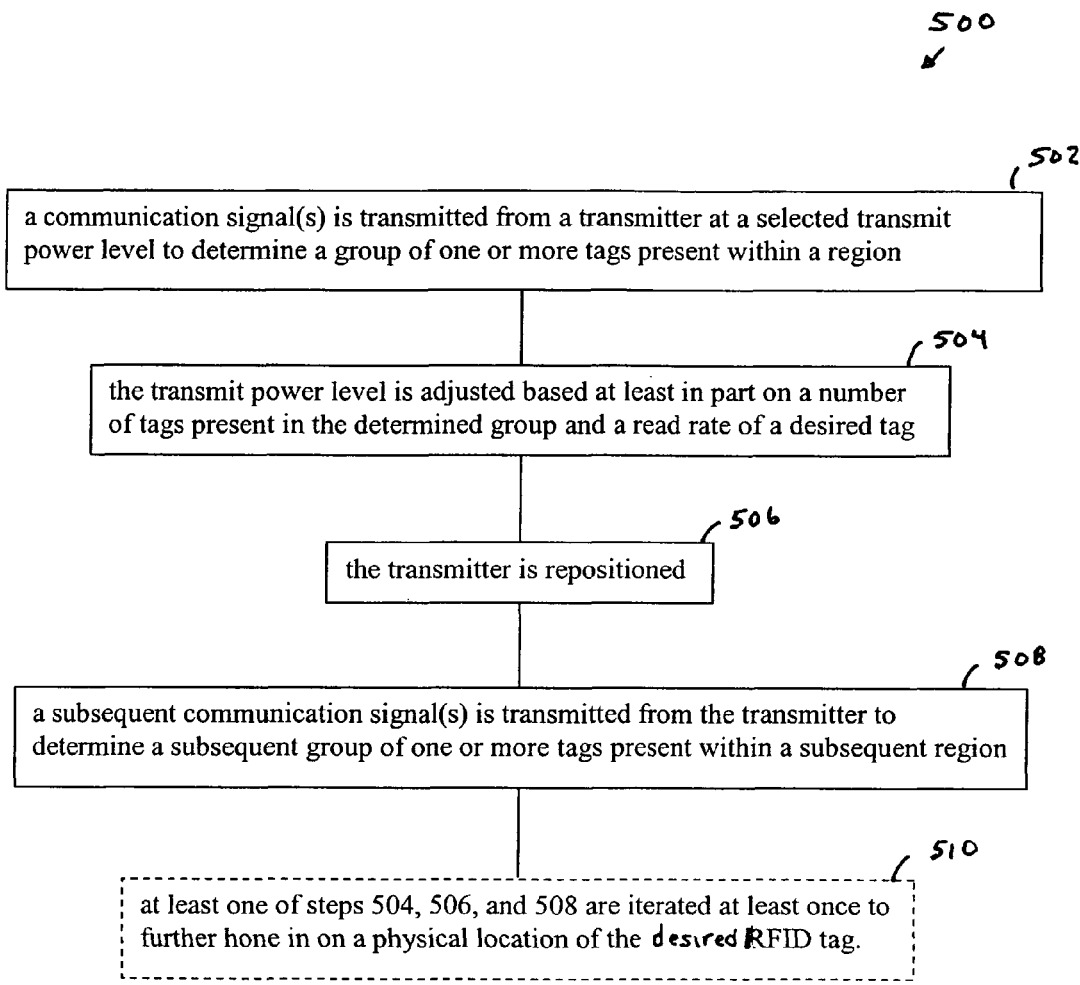

FIG. 5A shows a flowchart 500 providing example steps for operating a RFID communications device, such as device 410, to locate a specific tag, according to an example embodiment of the present invention. Other structural and operational embodiments will be apparent to persons skilled in the relevant art(s) based on the following discussion. For illustrative purposes, the steps of flowchart 500 are described in detail below with regard to FIGS. 6-13, which show example RFID readers and environments in which the process of flowchart 500 may be implemented.

Figure 6:
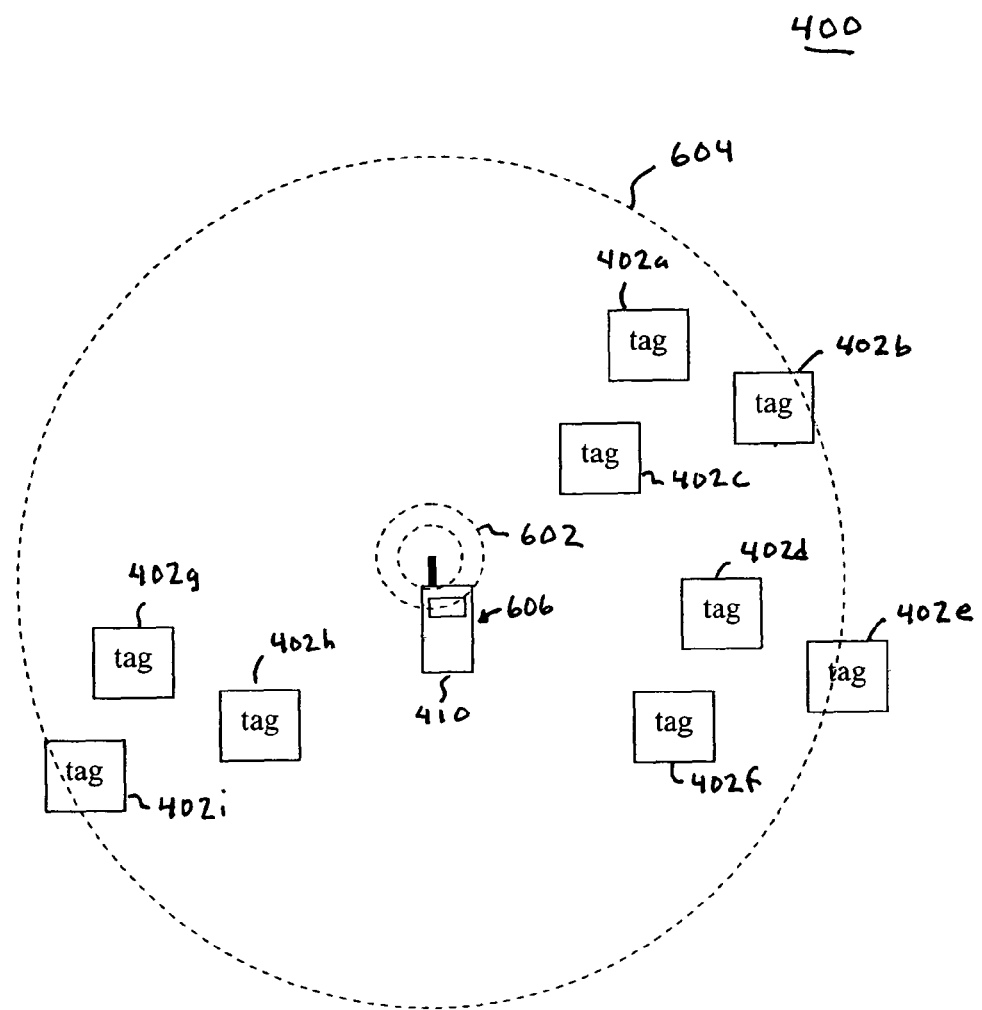
FIGS. 6-14 show an RFID environment in which a tag is being located, according to embodiments of the present invention.

Flowchart 500 begins with step 502. In step 502, a communication signal(s) is transmitted from a transmitter at a selected transmit power level to determine a group of one or more tags present within a region. For example, FIG. 6 shows RFID communications device 410 in environment 400 transmitting a first communications signal 602 to communicate with tags 402a-402i. First communications signal 602 (and further communications signals described herein) may include any number of one or more communications signals, such as interrogation or read signals, necessary to communicate with nearby tags. For example, first communications signal 602 may be transmitted by RFID communications device 410 to perform an interrogation round to determine a number of tags within a region 604 defined by a communication range of first communications signal 602.

The communication range of first communication signal 602 is at least in part dependent on a transmit power level used by a transmitter of RFID communications device 410 to transmit first communication signal 602. A higher transmit power level may increase a communication range of first communication signal 602, while a lower transmit power level may decrease a communication range of first communication signal 602. As shown in FIG. 6, each of tags 402a-402i is at least partially within region 604, so all of tags 402a-402i may respond to first communication signal 602. Thus, in the example of FIG. 6, RFID communications device 410 may determine that nine tags 402 are within region 604. A specific tag of interest, such as tag 402c, may have been one of the tags to respond to first communication signal 410. An operator of RFID communications device 410 may be interested in physically locating tag 402c. The operator may be able to physically locate the nine tags 402a-402i in environment 400. However, the operator may not be able to physically discern one of tags 402a-402i from others of tags 402. Thus, initially, the operator may not be able to physically locate tag 402c.

In step 504, the transmit power level is adjusted based at least in part on a number of tags present in the determined group and a read rate of a desired tag. For example, if the tag of interest responds (has a non-zero read rate), which in the current example is tag 402c, and further tags 402 respond to first communication signal 602, the transmit power at which level the transmitter of RFID communications device 410 transmitted first communication signal 602 may be reduced, to aid in honing in on a location of tag 402c, since it is known that tag 402c is within region 604 with other tags. Thus, in an embodiment, step 504 may include a step 512 shown in FIG. 5B, where a second transmit power level for the transmitter is selected to be less than a first transmit power.

Alternatively, if the tag of interest (e.g., tag 402c) does not respond to first communication signal 602 (has a zero read rate), the transmit power at which level the transmitter of RFID communications device 410 transmitted first communication signal 602 may be increased, in an attempt to reestablish communications with the tag of interest. Thus, in an embodiment, step 504 may include a step 514 shown in FIG. 5C, where a second transmit power level for the transmitter is selected to be greater than the first transmit power.

Furthermore, a relative read rate of the tag of interest (e.g., tag 402c) may depend on the transmit power level of the transmitted communication signal, and thus a transmit power level may be adjusted based on the relative read rate of the tag of interest. For example, first communication signal 602 may be used to perform repeated reads of any tags in range. When tag 402c is strongly receiving first communication signal 602 (e.g., tag 402c is well within the range of first communication signal 602), tag 402c is more likely to respond to a large proportion of the repeated reads, and thus have a relatively high read rate. When tag 402c is weakly receiving first communication signal 602 (e.g., tag 402c is relatively near the outer range of first communication signal 602), tag 402c is less likely to respond to a large proportion of the repeated reads, and thus have a relatively low read rate. A high read rate may thus indicate the transmit power level at which the transmitter of RFID communications device 410 transmitted first communication signal 602 may be decreased, to aid in honing in on a location of tag 402c. A low read rate may thus indicate the transmit power level at which the transmitter of RFID communications device 410 transmitted first communication signal 602 may be increased, to aid in honing in on a location of tag 402c.

In step 506, the transmitter is repositioned. Note that in embodiments, step 506 may be performed alternatively to step 504, or in addition to step 504. For example, RFID communications device 410 may be repositioned to transmit a next communication signal from a different location to the location from which first communication signal 602 was transmitted, to aid in honing in on the location of tag 402c. The next location for RFID communications device 410 may be determined by an operator of RFID communications device 410, or may be automatically determined by a location finding algorithm operating in RFID communications device 410 (or elsewhere), which provides the determined next location to the operator.

In step 508, a subsequent communication signal(s) is transmitted from the transmitter to determine a subsequent group of one or more tags present within a subsequent region. For example, a second communication signal may be transmitted subsequently to first communication signal 602 by a transmitter of RFID communications device 410. The second communication signal may be transmitted at a same or different transmit power level than was first communication signal 602 (e.g., a lesser or greater power level), and may be transmitted from a different location or same location as was first communication signal 602. Generally, at least one of transmit power level (step 504) and transmit location (step 506) are changed before transmitting the subsequent communication signal, to aid in honing in on a physical location of tag 402c.

Figure 7:
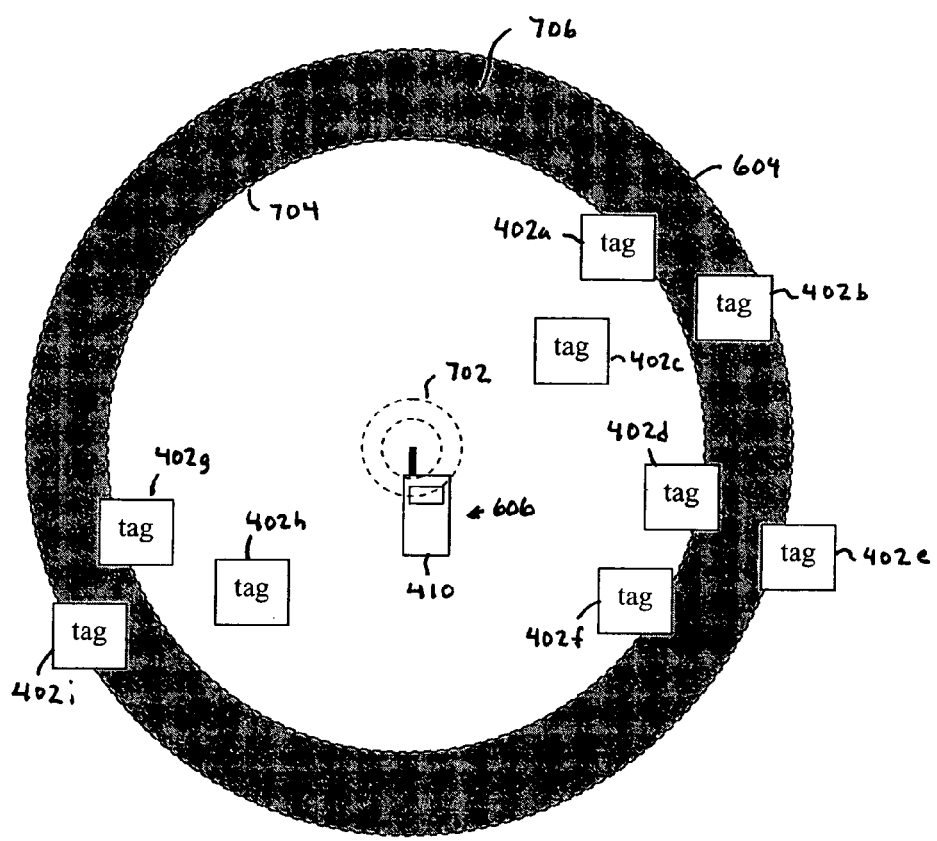

For example, FIG. 7 shows RFID communications device 410 in environment 400, transmitting a second communications signal 702 to communicate with tags 402, having a reduced transmit power level (e.g., according to step 512 of FIG. 5B). The reduced transmit power level results in a smaller region 704 covered by second communication signal 702 with respect to first communication signal 602, due to a reduced communication range of second communication signal 702. Such reduction of transmit power level may be used to narrow down a region of space in which the tag of interest is located, such as if the tag of interest had a relatively high read rate in region 604. In the example of FIG. 7, tag 402c is within region 704, and thus by reducing the transmit power level, an annular shaped region 706 of space within region 604, but outside of region 704, is eliminated from being considered as a possible physical location for tag 402c.

Figure 8:
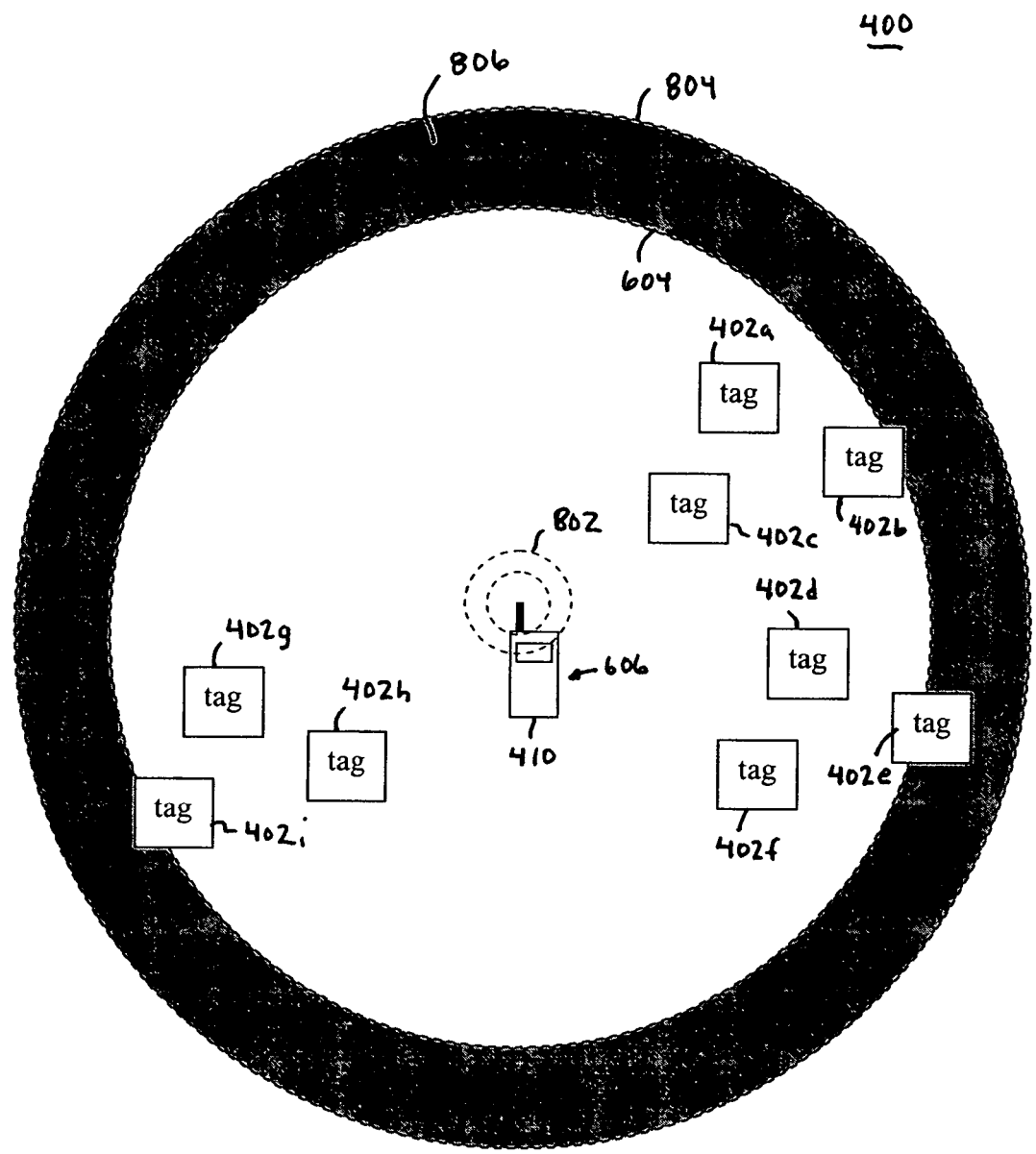

In another example, FIG. 8 shows RFID communications device 410 in environment 400, transmitting a second communication signal 802 to communicate with tags 402, having an increased transmit power level (e.g., according to step 514 of FIG. 5C). The increased transmit power level results in a larger region 804 covered by second communication signal 802 with respect to first communication signal 602, due to an increased communication range of second communication signal 802. Such an increase of transmit power level may be used to search an additional region of space in which the tag of interest may be located, if the tag of interest did not respond to first communication signal 602 (had a zero read rate), or had a relatively low read rate, and thus is presumably not located in region 604. Thus, in the example of FIG. 8, if the tag of interest responds to second communication signal 802, but did not respond to first communication signal 602, the tag of interest may be presumed to be located in the annular shaped region 806 of space outside of region 604, but within region 804.

Figure 9:
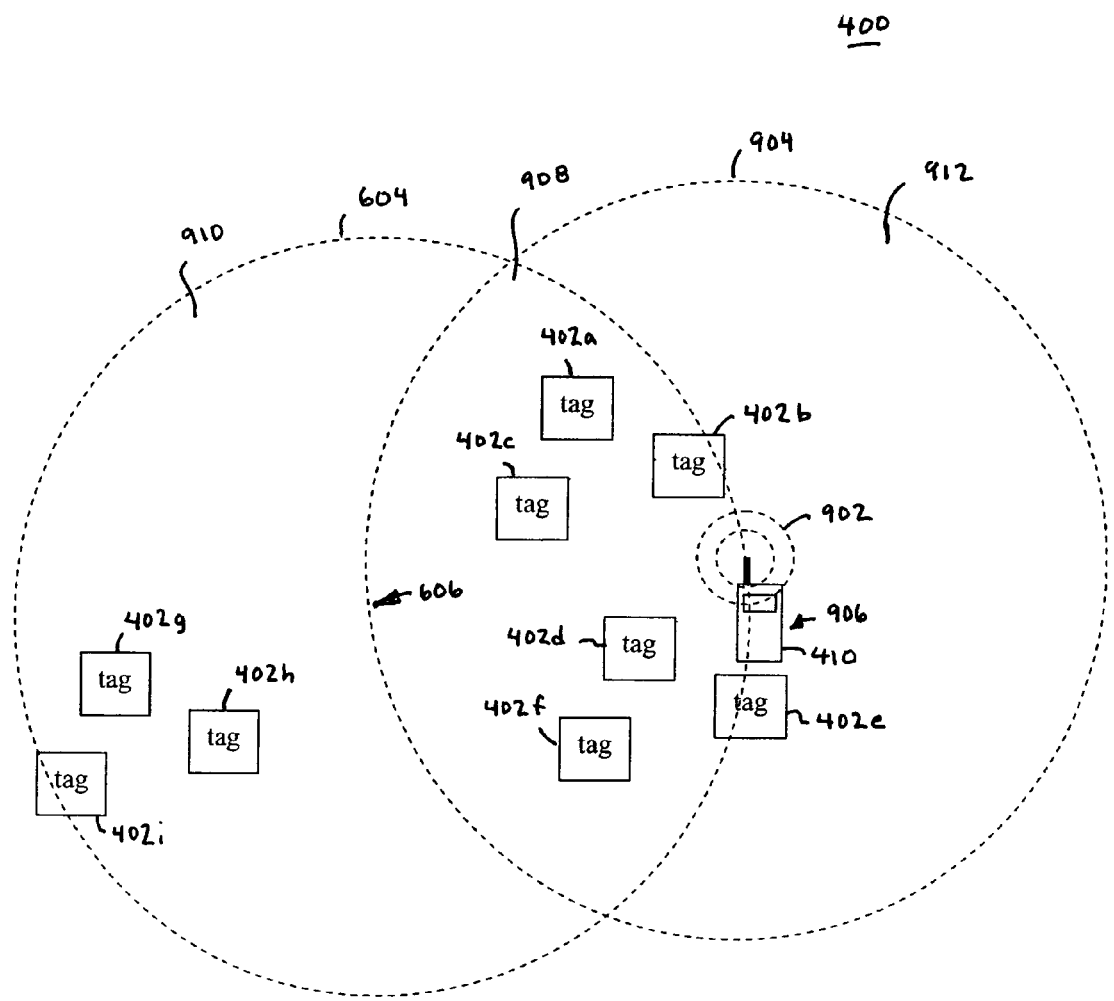

In another example, FIG. 9 shows RFID communications device 410 in environment 400, transmitting a second communication signal 902 to communicate with tags 402, having the same transmit power level as in FIG. 6, but having been moved (e.g., according to step 506 of FIG. 5) to a second location 906 different from a first location 606 for RFID communications device 410 in FIG. 6. Thus, second communication signal 902 has a similar sized coverage region 904 to coverage region 604 of first communication signal 602, but covers a different space because regions 604 and 904 are not the same. First region 604 and second region 904 both cover an oval shaped overlapping region 908. First region 604 includes a crescent shaped area 910 not included in second region 904, and second region 904 includes a crescent shaped area 912 not included in first region 604.

Such a repositioning of RFID communications device 410 may be used to search an alternative region of space outside of region 604 in which the tag of interest may be located, if the tag of interest did not respond to first communication signal 602 (and thus is presumably not located in region 604). In an embodiment, device 410 may be positioned so that regions 604 and 904 are not overlapping. Alternatively, such a repositioning of RFID communications device 410 may be used to narrow down to a smaller region of space in which the tag of interest may be included. For example, if the tag of interest responds to both of first and second communication signals 602 and 902, then the tag of interest is located in overlapping region 908. If the tag of interest responds to first communication signal 602, but not to second communication signal 902, then the tag of interest is located in crescent shaped area 910. If the tag of interest responds to second communication signal 902, but not to first communication signal 602, then the tag of interest is located in crescent shaped area 912.

Flowchart 500 includes another optional step 510. In step 510, at least one of steps 504, 506, and 508 are iterated at least once to further hone in on a physical location of the desired RFID tag. As described above, an increase or decrease in transmit power level (according to step 504) may be combined with a change of position (according to step 506) in any manner, prior to transmitting a subsequent communication signal to further aid in honing in on the location of a tag of interest. Further examples of locating a tag of interest according to the steps of flowchart 500 are described below.

Figure 10:
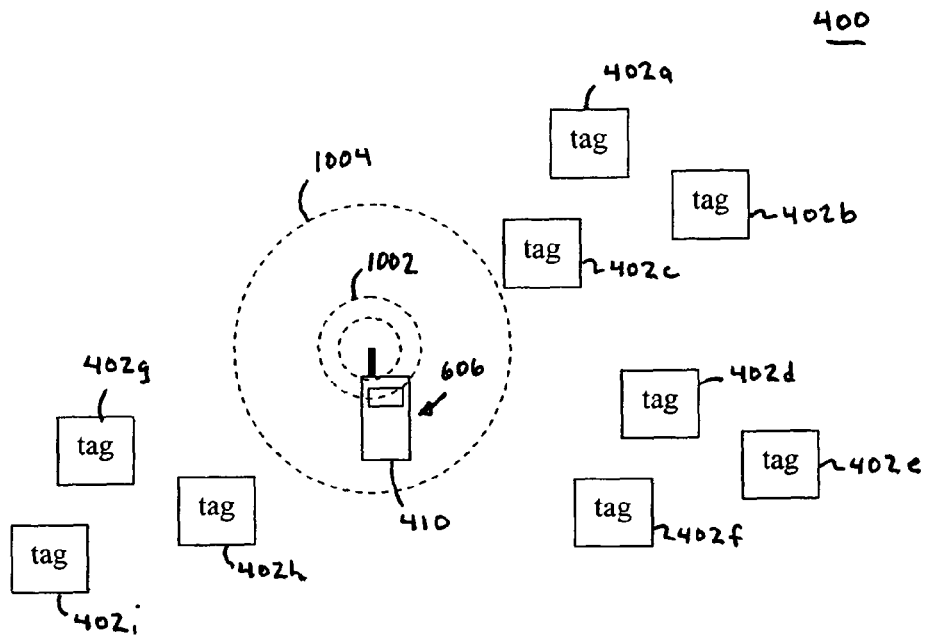

For example, FIG. 10 shows RFID communications device 410 in environment 400, transmitting a second communication signal 1002 to communicate with tags 402, following having transmitted first communication signal 602 in FIG. 6 (with tags 402a-402i having responding to first communication signal 602). Second communication signal 1002 has a reduced transmit power level (e.g., according to step 512 of FIG. 5B) because multiple tags 402 responding to first communication signal 602, including tag 402c. The reduced transmit power level results in a smaller region 1004 covered by second communication signal 1002 with respect to first communication signal 602, due to a reduced communication range of second communication signal 1002. In the example FIG. 10, all tags 402 are outside of region 1004, and thus no tags responded to second communication signal 1002. Thus, region 1004 is eliminated from the search for tag 402c. Device 410 can transmit a signal of a different power level (step 504) and/or be repositioned (step 506) to continue honing in on tag 402c.

Figure 11:
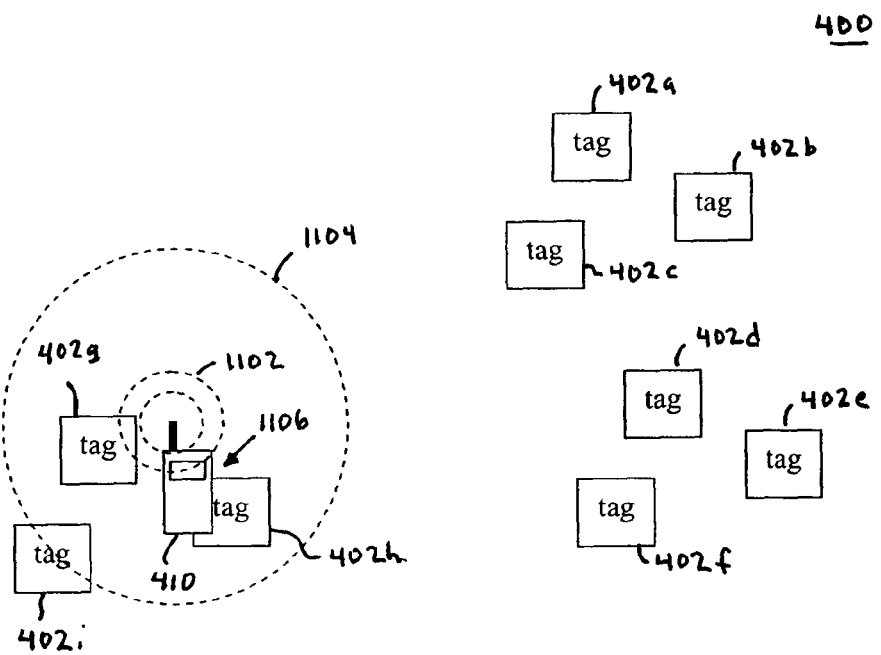

FIG. 11 shows RFID communications device 410 in environment 400, transmitting a third communication signal 1102 to communicate with tags 402, following having transmitted second communication signal 1002 in FIG. 10. Third communication signal 1102 has a higher transmit power level (e.g., according to step 514 of FIG. 5C), and has been repositioned from first location 606 to second location 1106. The increased transmit power level results in a larger region 1104 covered by third communication signal 1102 with respect to second communication signal 1002. In the example of FIG. 11, tags 402g-402i are within region 1104 and thus respond to third communication signal 1102. However, tag 402c is not within region 1104, and thus does not transmit a response signal to third communication signal 1102. Thus, region 1104 is eliminated from the search for tag 402c. Device 410 can transmit a signal of a different power level (step 504) and/or be repositioned (step 506) to continue honing in on tag 402c.

Figure 12:
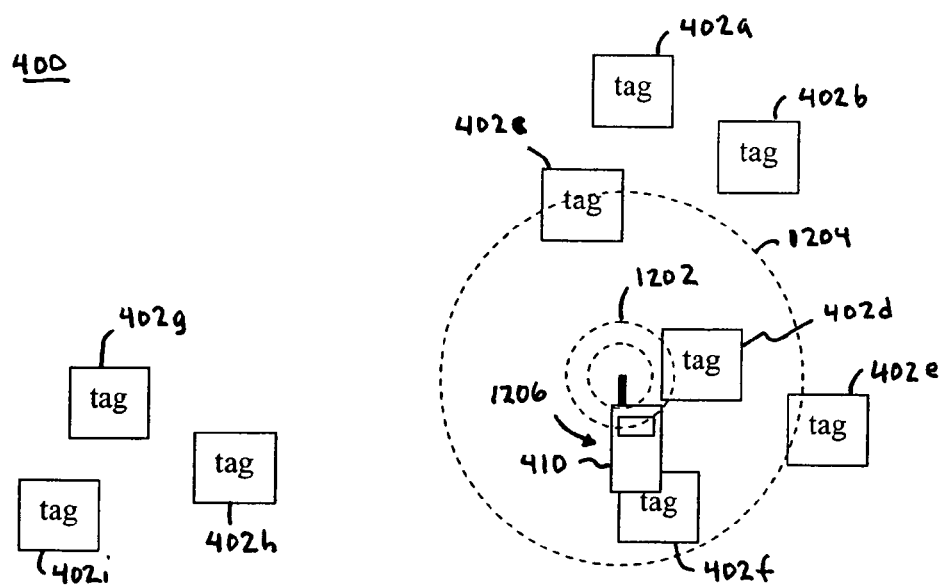

FIG. 12 shows RFID communications device 410 in environment 400, transmitting a fourth communication signal 1202 to communicate with tags 402, following having transmitted third communication signal 1102 in FIG. 11. Fourth communication signal 1202 has a same transmit power level as third communication signal 1102, and has been repositioned from second location 1106 to third location 1206. In the example of FIG. 12, tags 402c-402f are within region 1204 and thus respond to fourth communication signal 1202. Because, tag 402c responds, tag 402c is within region 1204, although because tag 402c is near the edge of region 1204, tag 402c may have a relatively low read rate. Because tags 402d-

402*f* also responded, further search iterating is required. Thus, device 410 may desire to search region 1204 in further detail. Device 410 can transmit a signal of a different power level (step 504) and/or be repositioned (step 506) to continue honing in on tag 402*c* with respect to region 1204.

Figure 13:
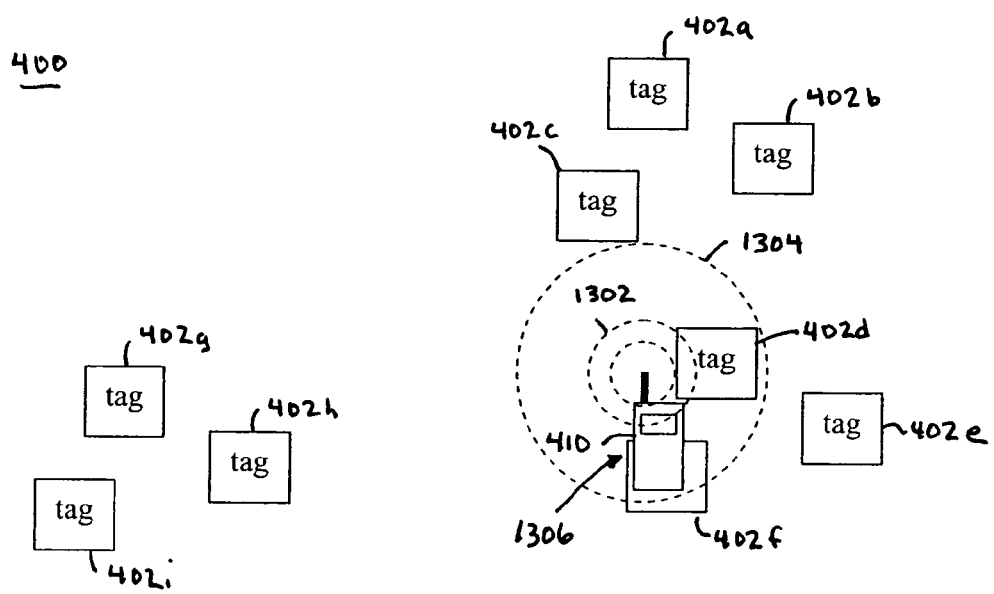

FIG. 13 shows RFID communications device 410 in environment 400, transmitting a fifth communication signal 1302 to communicate with tags 402, following having transmitted fourth communication signal 1202 in FIG. 12. Fourth communication signal 1302 has a lower transmit power level (e.g., according to step 512 of FIG. 5B), and has been repositioned from third location 1206 to fourth location 1306. The lower transmit power level results in a smaller region 1304 covered by fifth communication signal 1302 with respect to fourth communication signal 1202. In the example of FIG. 13, tags 402*d* and 402*f* are within region 1304 and may respond to fifth communication signal 1302. However, tag 402*c* is not within region 1304, and thus does not transmit a response signal to fifth communication signal 1302. Thus, region 1304 is eliminated from the search for tag 402*c*. Device 410 can transmit a signal of a different power level (step 504) and/or be repositioned (step 506) to continue honing in on tag 402*c*.

For example, the operator of device 410 may have noticed that a response was received from tag 402*c* when region 1204 was searched (including tags 402*c*-402*f*), while a response was not received from tag 402*c* when region 1304 was searched (including tags 402*d* and 402*f*). Thus, the operator of device 410 may want to more closely examine tag 402*c* and/or tag 402*e* to determine which one of them is tag 402*c*.

Figure 14:
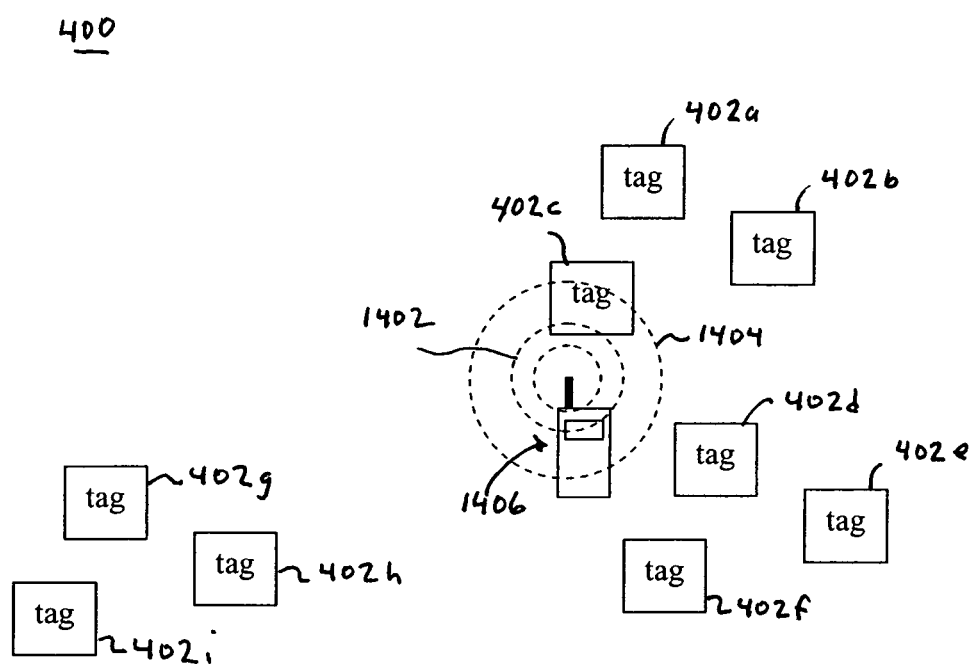

FIG. 14 shows RFID communications device 410 in environment 400, transmitting a sixth communication signal 1402 to communicate with tags 402, following having transmitted fifth communication signal 1302 in FIG. 13. Sixth communication signal 1402 has a decreased transmit power level with respect to fifth communication signal 1302, to only elicit a response from a single adjacent tag within a smaller region 1404. Furthermore, device 410 has been repositioned from fourth location 1306 to fifth location 1406 to be closer to the single tag. In the example of FIG. 14, only tag 402*c* is within region 1404 and may respond to sixth communication signal 1202. Because, tag 402*c* responds, tag 402*c* is within region 1204. Furthermore, since tag 402*c* is the only tag in region 1204, it is thereby determined to be tag 402*c*, the tag of interest. Because tag 402 is physically located, there is no reason to iterate further, and an investigation of tag 402*e* is not required Thus, in embodiments, any combination of transmitting signals, repositioning of a transmitter, and changing transmit power level may be performed to hone in on tags of interest. As mentioned above, such embodiments may be formed in an algorithmic manner, if desired. For example, if a tag is determined to be located within a region (with other tags also responding), the region may be divided into subregions of any shape, which can be sequentially searched by reducing a transmit power level to precisely cover a subregion, and by repositioning the tag sequentially through the subregions. For example, a first circular region may be divided into six overlapping circular subregions, with centers located at the six points of a hexagon. The subregions may be sequentially searched until the tag of interest is determined to be located in a specific subregion. If desired, the specific subregion can be further divided, and further searching can be performed. Subregions can have any desired shape, including circles, hexagons, squares, etc. Furthermore, device 410 may be configured to direct an operator where to reposition device 410 when searching a region. For example, a user interface may direct the operator according to a software algorithm to move to specific coordinates, may provide a direction and distance in which to move, or may provide other type of directions.

Figure 15:
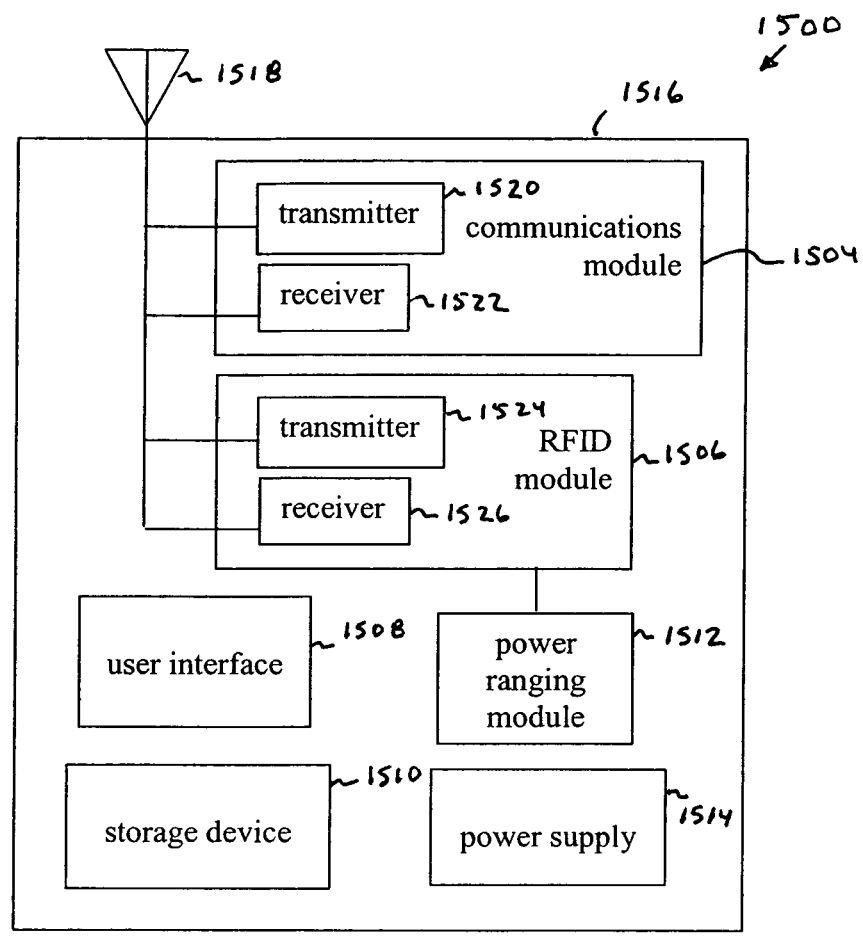
FIG. 15 shows an example RFID device that can be used to locate a tag, according to an embodiment of the present invention.

As described above, device 410 may be one of a variety of device types, including a RFID reader, a barcode scanner, a handheld computer, other device mentioned herein, or other known device type. FIG. 15 shows a mobile device 1500, including various example components and/or modules, as an example embodiment of device 410. In FIG. 15, mobile device 1500 includes a communications module 1504, an RFID module 1506, a storage device 1510, a user interface 1508, a power ranging module 1512, an antenna 1518, and a power supply 1514. Communications module 1504 includes a transmitter 1520 and a receiver 1522, and RFID module 1506 includes a transmitter 1524 and a receiver 1526. In an alternative embodiment, communications module 1504 and RFID module 1506 may share a common receiver and transmitter (or transceiver).

RFID module 1506 is configured to perform communications with RFID tags via antenna 1518, such as described above for reader 102 in FIG. 2. Communications module 1504 is configured to enable mobile device 1500 to communicate with a remote entity via antenna 1518. For example, communications module 1504 may be configured similarly to network interface 216 described above with respect to FIG. 2, to communicate data and/or instructions with a remote computer system.

A user interacts with mobile device 1500 through user interface 1508. For example, user interface 1508 can include any combination of one or more finger-operated buttons (such as a "trigger"), a keyboard, a graphical user interface (GUI), indicator lights, and/or other user input and display devices, for a user to interact with mobile device 1500, to cause mobile device 1500 to operate as described herein. User interface 1508 may further include a web browser interface for interacting with web pages and/or an E-mail tool for reading and writing E-mail messages.

Storage device 1514 is used to store information/data for mobile device 1500. Storage device 1510 can be any type of storage medium, including memory circuits (e.g., a RAM, ROM, EEPROM, or FLASH memory), a hard disk/drive, a floppy disk/drive, an optical disk/drive (e.g., CDROM, DVD, etc), etc., and any combination thereof. Storage device 1510 can be built-in storage of mobile device 1500, and/or can be additional storage installed in mobile device 1500.

Power supply 1514 can be any suitable power source for mobile device 1500, including one or more batteries or a power source interface (e.g., for DC or AC power).

Power ranging module 1512 is configured to adjust the transmit power level of a RFID communication signal generated by RFID module 1506 and transmitted by antenna 1518. For example, power ranging module 1512 is configured to reduce or increase the transmit power level. A user may interact with user interface 1508 to cause power ranging module 1512 to reduce or increase the transmit power level. Alternatively, power ranging module 1512 may include functionality to determine an increase or decrease in power level, depending on a particular situation. Power ranging module 1512 may include hardware, software, firmware, or any combination thereof to perform its functions. For example, power ranging module 1512 may include one or more adjustable gain amplifiers, voltage regulators, adjustable voltage supplies, and/or other circuitry to modify a voltage level at which a communication signal is generated by RFID module 1516. Thus, power ranging module 1512 enables an operator of mobile device 1500 to hone in on a physical location of a desired tag by adjusting a transmit power level according to the processes described above. Power ranging module 1512 may include an search algorithm to direct an operator of mobile device 1500 to reposition mobile device 1500 for subsequent transmission of communication signals to search for tags.

Note that, depending on the particular application for the mobile device, mobile device 1500 may include additional or alternative components. For example, mobile device 1500 may include machine readable symbol scanner (e.g., barcode scanner) functionality for scanning machine readable symbols (e.g., barcodes).

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system using a removable storage drive, hard drive, or communications interface. The control logic (software), when executed by a processor, causes the processor to perform the functions of the invention as described herein.

According to an example embodiment, a RFID device may execute computer-readable instructions to initiate generation of communications signals to communicate with a tag, to process tag responses, to vary transmit power levels, to direct an operator to reposition the RFID device, etc.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for locating a radio frequency identification (RFID) tag, comprising:
   identifying a desired RFID tag at a distance to be located among a plurality of RFID tags;
   transmitting a plurality of interrogation signals from a transmitter in a portable RFID reader at a selected transmit power level to determine a group of tags present within a region and a relative read rate of the desired RFID tag, the group including the desired RFID tag, wherein a physical location of the desired RFID tag is unknown, and wherein the read rate of the desired RFID tag comprises a rate of response to the plurality of interrogation signals;
   performing each of the following steps at least once to hone in on the physical location of the desired RFID tag using the transmitter:
      lowering the transmit power level based at least on a number of tags present in the determined group and the relative read rate, until the desired RFID tag's read rate is low;
      transmitting subsequent interrogation signal from the transmitter at the adjusted transmit power level to determine a subsequent group of tags present within a subsequent region and a subsequent relative read rate of the desired RFID tag, and
      repositioning the transmitter.

2. A method for locating a radio frequency identification (RFID) tag, comprising:
   identifying a desired RFID tag at a distance to be located;
   selecting a first transmit power level;
   transmitting a plurality of interrogation signals from a transmitter at the first transmit power level to determine a first group of tags present within a first region and a read rate of the desired RFID tag if the desired RFID tag is present in the first group, wherein the read rate is based upon transmit power of the transmitter and a distance of the desired RFID tag from the transmitter, and wherein the read rate comprises a rate of response to the plurality of interrogation signals; and
   lowering the first transmit power level to a second transmit power level based on a number of tags present in the first group and on the read rate of the desired RFID tag if the desired RFID tag is present in the first group, and until the desired RFID tag's read rate is low.

3. The method of claim 2, wherein said adjusting step further comprises:
   selecting the second transmit power level to be less than the first transmit power level if the first group includes the desired RFID tag; and
   selecting the second transmit power level to be greater than the first transmit power level if the first group does not include the desired RFID tag.

4. The method of claim 2, wherein said adjusting step further comprises:
   adjusting the first transmit power level to a second transmit power level based on a relative value of the read rate of the desired RFID tag if the desired RFID tag is present in the first group.

5. The method of claim 2, further comprising:
   transmitting a second at least one additional interrogation signal from the transmitter at the second transmit power level to determine a second group of tags present within a second region and a second read rate of the desired RFID tag; and
   adjusting the second transmit power level to a third transmit power level based on a number of tags present in the second group and on the second read rate of the desired RFID tag.

6. The method of claim 2, further comprising:
   iterating at least one of the transmitting step and the adjusting step at least once to hone in on a physical location of the desired RFID tag using the transmitter.

7. The method of claim 2, wherein said transmitting step comprises:
   transmitting the first at least one interrogation signal from the transmitter at a first location.

8. The method of claim 7, further comprising:
   repositioning the transmitter from the first location to a second location; and
   transmitting a second interrogation signal from the transmitter at the second location and at the second transmit power level to determine a second group of tags present within a second region and a second read rate of the desired RFID tag.

9. The method of claim 2, further comprising:
   repositioning the transmitter from a first location to a second location; and iterating at least one of the transmitting step, the adjusting step, and the repositioning step at least once to hone in on a physical location of the desired RFID tag.

10. The method of claim 2, further comprising:
enabling a user to interact with a user interface associated with the transmitter to perform said adjusting of the first transmit power level.

11. A method for locating a radio frequency identification (RFID) tag, comprising:
transmitting a plurality of interrogation signals from a transmitter at a first location to determine a first group of tags present within a first region and a read rate of a desired RFID tag at a distance that has been identified to be located, wherein the read rate is based upon transmit power of the transmitter and a distance of the desired RFID tag from the transmitter, and comprises a rate of response to the interrogation signals;
selecting a second location to be located within the first region if the first group includes the desired RFID tag or to be located outside of the first region if the first group does not include the desired RFID tag;
repositioning the transmitter from the first location to a second location, wherein the repositioning and the selecting is responsive to signals received from the transmitter; and
transmitting a second plurality of interrogation signals from the transmitter at the second location to determine a second group of tags present within a second region;
selecting the second transmit power level to be less than the first transmit power level when the first group includes the desired RFID tag; and wherein the second transmit power level based on a relative value of the read rate of the desired RFID tag if the desired RFID tag is present in the first group; and
continuing to lower the second transmit power level based on the read rate of the desired RFID tag until the desired RFID tag's read rate is low.

12. The method of claim 11, further comprising:
performing one or more of the following steps at least once to hone in on a physical location of the desired RFID tag:
repositioning the transmitter to a subsequent location, and
transmitting a subsequent interrogation signals from the transmitter at the subsequent location to determine a subsequent group of tags present within a subsequent region and a subsequent read rate of the desired RFID tag.

13. A radio frequency identification (RFID) communications device, comprising:
an antenna;
a radio frequency identification (RFID) module coupled to the antenna, wherein the RFID module is configured to generate a plurality of interrogation signals that are transmitted by the antenna at a transmit power level, and the RFID module is configured to demodulate tag response signals received by the antenna in response to the interrogation signals to determine a group of tags present within a region and a read rate of a desired RFID tag at a distance that has been identified to be located, wherein the read rate is based upon transmit power of the transmitter and a distance of the desired RFID tag from the transmitter, and comprises a response rate of the desired RFID tag to the plurality of transmitted interrogation signals; and
a power ranging module configured to lower the transmit power level of the interrogation signals to enable an operator of the RFID communications device to hone in on a physical location of the desired RFID tag based upon the read rate and the at least one tag response signal, until the desired RFID tag's read rate is low.

14. The RFID communications device of claim 13, wherein the RFID communications device is mobile, thereby enabling an operator of the RFID communications device to reposition the RFID communications device to hone in on the physical location of the desired RFID tag.

15. The RFID communications device of claim 13, further comprising:
a user interface configured to enable an operator to interact with the power ranging module to adjust the transmit power level.

16. The RFID communications device of claim 13, wherein the RFID communications device is a RFID reader.

17. The RFID communications device of claim 13, wherein the RFID communications device is an RFID module that is attachable as an accessory to a handheld device.

18. The RFID communications device of claim 13, wherein transmit power level is decreased if a first at least one tag response signal received by the antenna determines that the desired RFID tag is present within the region.

19. The RFID communications device of claim 13, wherein transmit power level is increased if a first at least one tag response signal received by the antenna determines that the desired RFID tag is not present within the region.

20. The method of claim 2, further comprising:
using an annular shaped region defined by the first transmit power level and the second transmit power level to locate the desired RFID tag.

21. The method of claim 1, further comprising:
using a crescent shaped region defined by the repositioning of the transmitter to locate the desired RFID tag.

* * * * *